H. DASSOW.
BREAD CUTTING MACHINE.
APPLICATION FILED MAY 23, 1917.
1,256,114.
Patented Feb. 12, 1918.
2 SHEETS—SHEET 1.
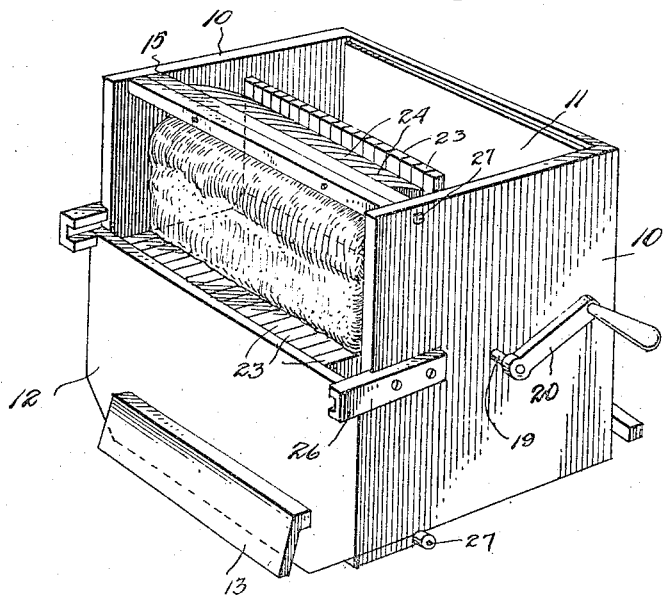
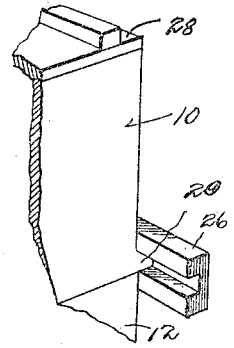
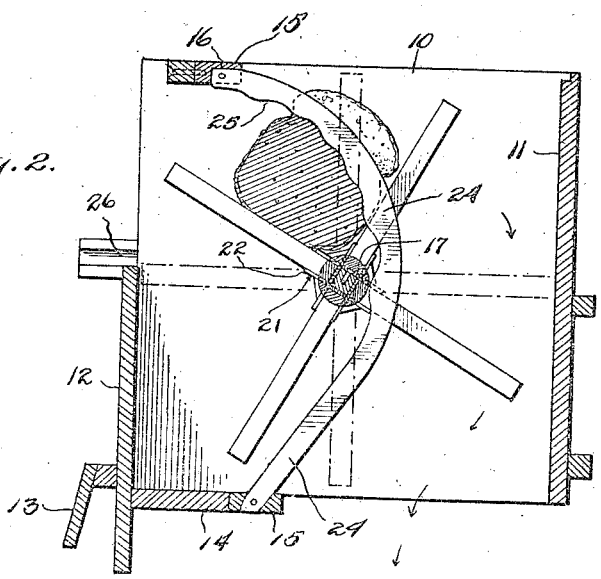
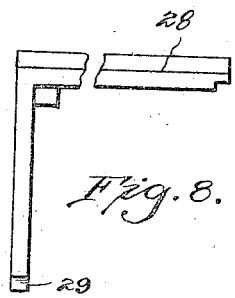
Witnesses
Inventor
H. Dassow
By R. Morgan Elliott & Co.
Attorneys

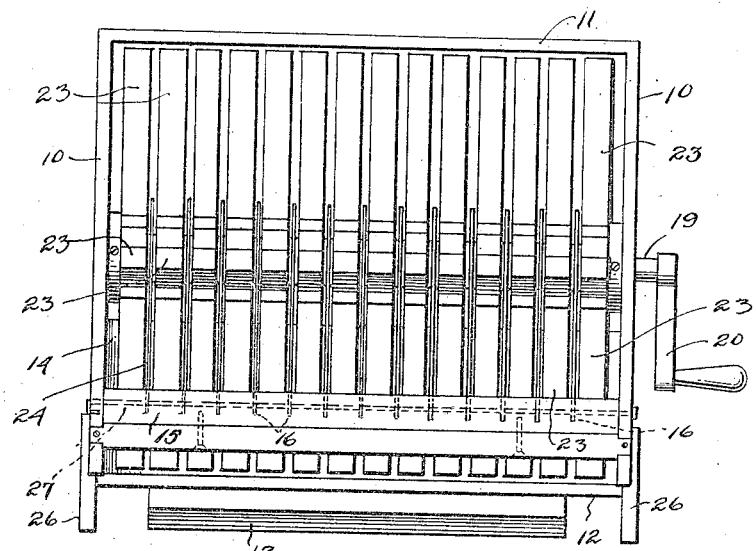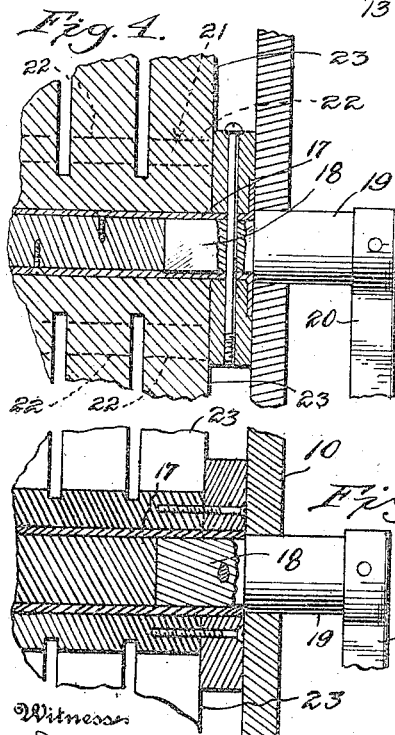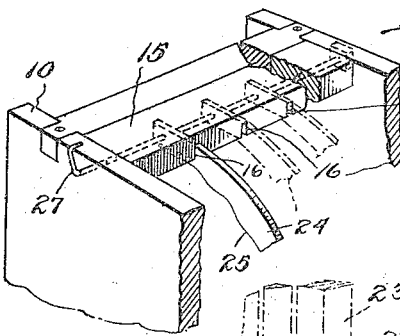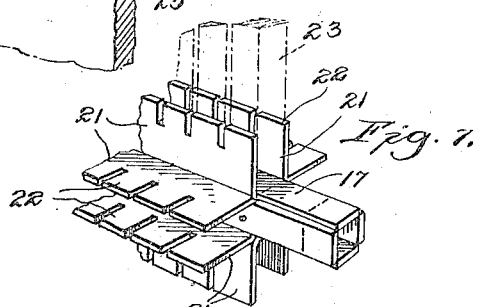

UNITED STATES PATENT OFFICE.

HARRY DASSOW, OF FARGO, NORTH DAKOTA.

BREAD-CUTTING MACHINE.

1,256,114.

Specification of Letters Patent. Patented Feb. 12, 1918.

Application filed May 23, 1917. Serial No. 170,535.

*To all whom it may concern:*

Be it known that I, HARRY DASSOW, a subject of the Czar of Russia, residing at Fargo, in the county of Cass and State of North Dakota, have invented certain new and useful Improvements in Bread-Cutting Machines, of which the following is a specification.

This invention relates to bread cutting machines and has special reference to a bread cutting machine designed to cut a loaf of bread into slices at one operation.

A second object of the invention is to provide an improved device of this character wherein a simple rotary movement will effect the cutting of a loaf into slices, all of the slices being cut simultaneously.

A third object of the invention is to provide an improved construction of devices of this character wherein the cutting knives may be readily removed for sharpening.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a perspective view of a cutting machine constructed in accordance with this invention, the top of the machine being removed and the feed board absent.

Fig. 2 is a transverse section through the machine.

Fig. 3 is a plan view of the machine.

Fig. 4 is a detail longitudinal section showing the bearing of the rotary member at the crank end.

Fig. 5 is a view similar to Fig. 4, but taken at an angle of 45° thereto.

Fig. 6 is a detail perspective view, partly broken away and showing the manner of retaining the knives in place.

Fig. 7 is a detail perspective view of a portion of a square shaft and finger holding plates, used in connection herewith.

Fig. 8 is a detail end view of a top or cover used herewith, a portion of the cover being broken away.

Fig. 9 is a detail perspective view showing the application of the cover to the device.

In the embodiment of the invention herein illustrated there is provided a casing having the side walls 10 and a back wall 11 which are of uniform height. The casing also is provided with a front wall 12 which extends upward to about the center of the front of the casing, the upper part of the front being open. This front wall furthermore extends downward and is provided with a lip 13 on its lower portion so that the device may be hung over the edge of a box or tray for the reception of the sliced bread. The bottom of the casing is open with the exception of a small portion at one side which is closed by a bottom 14 and at the top and the bottom of the casing are knife supporting bars 15 having knife end receiving slots 16 formed therein.

Extending from side to side of the casing is a square tubular shaft 17 and one end of this shaft is journaled in one side of the casing in any suitable manner while the other end receives the square end 18 of a shaft section 19 journaled in the side wall 10 and carrying a handled crank 20. The tubular shaft 17 is formed of a series of plates having flanges 21 divided to form fingers 22 which are spaced as shown in Fig. 7. It will be observed that each of the plates is provided with a pair of these flanges which extend in parallel relation so that between the fingers 22 may be received and held finger bars 23 likewise spaced as can be seen by reference to Figs. 3, 4, and 5. Fitted in the sockets 16 are the perforated ends of curved knife blades 24, the blades extending around the tubular shaft with their corrugated cutting edges 25 fastening the shaft as can be clearly seen in Fig. 2. The reason for forming the knife blades in this manner is so that the cutting of the loaf will be done with a slicing action while at the same time the loaf, which is positioned on the finger bars 23, will be held by the action of the knife blades on these bars. It is to be understood that these knife blades 24 lie in the spaces between the finger bars 23. Extending forwardly from the upper edge of the front 12 are slotted walls 26 which may receive a feed board, if desired, so that the bread can be fed on to the fingers 23 from such feed board. In order to retain the knives in position there are employed pins 27 which pass longitudinally through respective bars 15 and transversely through the ends of the knife blades 24. It will be obvious that simply withdrawing this pin will free the knife blades and permit them to be removed for sharpening.

In order to cover the device when not in use a suitable angular cover plate 28 is provided which fits the top and pan portion of the front, the plate being provided with lugs 29 extending into the slotted walls 26 when in position to cover the device.

In using the device the cover plate is removed and bread is fed into the front. The handle is then rotated so that the shaft is turned in the direction shown by the arrows in Fig. 2, the bread being slid on to respective sets of finger bars. Rotation of the shaft will cause the bread to pass upward as shown in said Fig. 2 so that the knives 24 divide it into slices. Continued rotation of the shaft carries the sliced bread around following the arrows in Fig. 2 and drops it into the tray beneath the device.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a bread cutting machine; a casing, a shaft journaled in the side walls of the casing and extending across said casing, a plurality of series of spaced fingers fixed to said shaft, said series extending radially from the shaft with each series at right angles to the adjacent series, a series of knife blades curved around the shaft with their cutting edges facing toward said shaft, said blades being arranged in the spaces between the fingers of each series, and means to detachably connect the blades to the casing.

2. In a bread cutting machine; a casing, a shaft extending across said casing, means to rotate said shaft, a plurality of series of spaced fingers carried by said shaft, and a series of knife blades mounted in said casing and extending between said fingers comprising upper and lower bars having sockets therein receiving the ends of said blades, and removable pins passed longitudinally through said bars and transversely through the blade ends.

In testimony whereof I affix my signature.

HARRY DASSOW.

Witnesses:
H. H. ROBERTS,
H. MYMAKER.

Copies of this patent may be obtained for five cents each, by addressing the "Commissioner of Patents, Washington, D. C."